United States Patent Office 2,835,613

Patented May 20, 1958

2,835,613

METHOD OF SURFACE-TREATING SEMI-CONDUCTORS

Pieter Willem Haayman, Eindhoven, Netherlands, assignor, by mesne assignments, to North American Philips Company, Inc., New York, N. Y., a corporation of Delaware

No Drawing. Application September 13, 1955 Serial No. 534,150

6 Claims. (Cl. 148—1.5)

This invention relates to a method for treating the surface of semi-conductive bodies to change, in some manner, the electrical properties thereof.

In the manufacture of semi-conductor devices, such as transistors, phototransistors and crystal diodes, it is frequently necessary for the surface of the semi-conductor body to be locally treated, such that the body at the area concerned undergoes a variation in conductivity type, for example, a conversion from n-type to p-type, thus establishing a p-n junction, or a variation in conductivity. These variations are a result of diffusion within the body of certain impurity elements capable of producing the desired change. A known technique for doing this involves clamping an alloy body containing the desired impurities against the semi-conductive body, followed by heating of the two bodies such that the impurity diffuses from the alloy into the semi-conductive body, a case of pure solid-state diffusion. However, this technique suffers from the disadvantage that it cannot be ensured that the bodies are in uniform contact with one another, resulting in an irregular variation of conductivity in the semi-conductive body. Furthermore, the accessibility of the impurity from the alloy is rendered difficult, since it has to be effected by diffusion through the alloy body. Finally, this method can be carried out only at temperatures below the fusion point of the alloy, and the rate at which the impurity diffuses into the semi-conductive body is very low at these temperatures. Another known technique is to expose a semi-conductive body to the vapor of the impurity. However, in this method, it is very difficult to restrict the desired treatment to a particular portion of the surface of the semi-conductive body.

The invention relates to a method of treating the surface of a semi-conductive body in which these difficulties of the prior art are completely eliminated.

According to the invention, the semi-conductive body is temporarily brought into contact with a quantity of a molten substance containing the desired impurity and in which the semi-conductive body is not soluble to any appreciable extent, and thereafter the substance in the liquid state is removed from the semi-conductive body after the desired impurity diffusion has been effected.

It is to be noted that this technique is completely different from the standard technique for making a fused rectifying connection to a semi-conductive body—the so-called alloy technique in the manufacture of transistors—in which a metal body containing an impurity is fused to the semi-conductive body and allowed to solidify thereon. During solidification, a thin semi-conductive layer having a different conductivity type or conductivity regrows on the original lattice of the semi-conductive body. In this method, it is difficult to avoid mechanical stresses which occur as a result of the difference between the coefficients of expansion of the semi-conductive material and the metal, which solidify together.

In the invention, on the other hand, as a result of surface tension of the molten substance, which if desired may be surrounded by a mandrel, the treatment of the surface of the semi-conductive body remains restricted within exactly predetermined limits, defined for instance by the surface tension of the substance, and stress in the material does not occur because the fluid molten substance is removed and not allowed to solidify on the semi-conductor. A liberal supply of the impurity is ensured, however, since the impurity can readily diffuse through the molten substance, and furthermore, convection always occurs. There is also a very intimate contact between the molten substance and the semi-conductive body throughout the area of engagement, so that the treatment of the surface is very uniform.

The method of the invention is very suitable for use with semi-conductive bodies which are stable at high temperatures, such as silicon and Carborundum, but also with many other well-known semi-conductors, like germanium, and also with compounds, like many oxides, sulphides and halogenides, and with the so-called III–V compounds, for instance indium-antimonide, gallium-antimonide. For a semi-conductor which readily dissolves in many other molten elements, the treatment should preferably be carried out below the temperature at which dissolution takes place.

If the semi-conductive body consists of silicon or carborundum, lead may advantageously be used as the molten metal.

The invention will now be described with reference to several examples.

A pellet of lead containing 2% phosphorus is placed on a small disc cut from a p-type silicon monocrystal having a resistivity of 2 ohm-cm. The assembly is heated above the fusion point of lead, for example, up to 1150° C., in a closed vessel at a pressure of 1 atm. The silicon which is located directly under the molten lead drop thus formed is converted to n-type conductivity, due to diffusion of phosphorus into it. After 30 minutes at that temperature, the molten lead drop is removed by physical means. The result is a very precisely controlled, both area- and depth-wise, p-n junction. In the same way, lead containing 5% of gallium may be placed on a silicon monocrystal of the p-type, and maintained for three hours at the same temperature and pressure.

On Carborundum of the p-type conductivity, the same treatment may be carried out with tin containing 2% of phosphorus, for 30 minutes, while a surface layer of n-type Carborundum may be transformed to p-type by treatment with tin containing 2% of aluminum at 1500° C. for 60 hours.

Similarly, other conductivity-determining impurities, either acceptors or donors, may be dissolved in lead or any other metal serving as a carrier, which also includes alloys. Other carriers, for example a glass consisting of 50% $SiO_2$ and 50% PbO, may also be used.

While I have described my invention in connection with specific embodiments and applications, other modifications thereof will be readily apparent to those skilled in this art without departing from the spirit and scope of the invention as defined in the appended claims.

What is claimed is:

1. A method of treating a surface portion of the surface of a semi-conductive body, comprising bringing the semi-conductive body into contact with a quantity of a molten material containing a conductivity determining impurity and in which the material of the semi-conductive body is not soluble to any appreciable extent and for a time interval at which the conductivity of the contacted surface portion is altered due to diffusion of the impurity therein, and thereafter removing the molten material while in the molten state and before freezing thereof from the semi-conductive body.

2. A method of treating the surface of a semi-conductive body as claimed in claim 1 wherein the semi-conductive body is a substance selected from the group consisting of silicon and Carborundum, and the molten material is lead containing an impurity.

3. A method of forming a p-n junction in a semi-conductive body having a portion exhibiting one conductivity type, which comprises bringing said portion of said semi-conductive body into contact with a molten material in which the semi-conductive body is substantially insoluble and containing an impurity capable of converting said body to the opposite conductivity type when incorporated therein, maintaining said contact between the body and the molten material until such time as sufficient impurity material has diffused into said body to convert a portion thereof into said opposite conductivity type, and, while said molten material is still in the liquid state, terminating the contact between the molten material and the body to terminate the said conversion of conductivity.

4. A method as set forth in claim 3 wherein the molten material is selected from the group consisting of lead and tin.

5. A method of forming a p-n junction in a semi-conductive body having one conductivity-type portion, which comprises placing on the surface of said portion a material containing an impurity capable of converting to the opposite conductivity-type said portion when incorporated therein, said semi-conductive portion being substantially insoluble in said material when the latter is molten, heating said material to place same in the molten state while in contact with the semi-conductive body and for a time interval at which said impurity diffuses into said body and converts a part thereof into the opposite conductivity-type, and, before said molten material solidifies and while it is still in the liquid state, physically removing it from the semi-conductive body to terminate the conversion.

6. A method as set forth in claim 5 wherein the semi-conductive body is selected from the group consisting of silicon and Carborundum, and the impurity-bearing material is lead.

References Cited in the file of this patent

UNITED STATES PATENTS

| | | |
|---|---|---|
| 2,644,852 | Dunlap | July 7, 1953 |
| 2,725,315 | Fuller | Nov. 29, 1955 |
| 2,784,121 | Fuller | Mar. 5, 1957 |

FOREIGN PATENTS

| | | |
|---|---|---|
| 506,110 | Belgium | Oct. 15, 1951 |
| 728,129 | Great Britain | Apr. 13, 1955 |

UNITED STATES PATENT OFFICE

CERTIFICATE OF CORRECTION

Patent No. 2,835,613 May 20, 1958

Pieter Willem Haayman

It is hereby certified that error appears in the above numbered patent requiring correction and that the said Letters Patent should read as corrected below.

In the heading to the printed specification, between lines 9 and 10, insert -- Claims priority, application Netherlands September 15, 1954 --; in the printed specification, column 2, lines 61 and 62, for "a surface portion of the surface of a semi-conductive body, comprising bringing" read -- the surface of a semi-conductive body, comprising bringing a surface portion of --.

Signed and sealed this 19th day of August 1958.

(SEAL)

Attest:

KARL H. AXLINE

Attesting Officer

ROBERT C. WATSON

Commissioner of Patents